United States Patent
Yamamoto et al.

(10) Patent No.: US 6,386,173 B1
(45) Date of Patent: May 14, 2002

(54) IN-CYLINDER INJECTION TYPE INTERNAL COMBUSTION ENGINE

(75) Inventors: Shigeo Yamamoto; Kazuyoshi Nakane; Hiroaki Miyamoto; Dai Tanaka; Jun Takemura; Hiromitsu Ando, all of Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/559,270

(22) Filed: Apr. 27, 2000

(30) Foreign Application Priority Data

Apr. 28, 1999 (JP) ............................................. 11-122989

(51) Int. Cl.⁷ ................................................ F02B 17/00
(52) U.S. Cl. ......................... 123/295; 123/305; 123/676
(58) Field of Search ............................... 123/295, 676, 123/299, 300, 305, 480, 179.16

(56) References Cited

U.S. PATENT DOCUMENTS

| 5,910,096 A | * | 6/1999 | Hepburn et al. ............... 60/274 |
| 5,967,113 A | | 10/1999 | Kaneko et al. .............. 123/295 |
| 5,975,044 A | * | 11/1999 | Kamura et al. .............. 123/295 |
| 6,026,779 A | * | 2/2000 | Obata et al. ................ 123/295 |
| 6,058,905 A | * | 5/2000 | Nagaishi et al. ............. 123/295 |
| 6,161,530 A | * | 12/2000 | Kakizaki et al. ............. 123/674 |

FOREIGN PATENT DOCUMENTS

JP 8312404 A 11/1996
JP 10169488 A 6/1998

* cited by examiner

Primary Examiner—Willis R. Wolfe
Assistant Examiner—Mahmoud Gimie

(57) ABSTRACT

An electronic control unit (40) for controlling an internal combustion engine drive executes a first operation mode for injecting a fuel in a suction stroke while making an air/fuel ratio feedback control, when a demand for improving output characteristics is made in a medium/high load drive state of the engine. In response to a demand for raising the temperature of a catalyst, moreover, the first operation mode is switched to a second operation mode in which the fuel is injected in a compression stroke while making an air/fuel ratio feedback control performing a predetermined air/fuel ratio in the vicinity of a stoichiometric air/fuel ratio as a target value. At the time of switching to each of these operation modes, moreover, the air/fuel ratio correction coefficient of the air/fuel ratio feedback is increased/decreased to promote a shift of the output turning point of an O₂ sensor (22) thereby to prevent such an instability of the air/fuel ratio control as is caused by the shift of the target air/fuel ratio accompanied with the switching to each operation mode. As a result, the temperature of an exhaust purifying catalyst (3) is raised in the second operation mode for performing the compression stroke injection stably in the vicinity of the stoichiometric air/fuel ratio, so that the exhaust cleaning performance can be improved and so that the output characteristics can be improved by executing the first operation mode.

11 Claims, 8 Drawing Sheets

S60 : Compression Stroke O2-F/B Mode Just Before ?
S61 : Suction Stroke O2-F/B Mode Just Before ?

IN-CYLINDER INJECTION TYPE INTERNAL COMBUSTION ENGINE

BACKGROUND OF THE INVENTION

The present invention relates to an in-cylinder injection type internal combustion engine.

Recently, an in-cylinder injection type internal combustion engine for improving an engine output and a fuel economy has been practiced. In the internal combustion engine of this kind, as disclosed in Unexamined Published Japanese Patent Application 8-312404, for example, fuel is injected in a suction stroke while making an air/fuel ratio feedback control performing the stoichiometric air/fuel ratio as a target value in a medium/high load region that demands an engine output. In a low load region, on the other hand, the fuel is injected in the compression stroke while making an open loop control at a super-lean air/fuel ratio (e.g., 25 or higher) which is far leaner than the stoichiometric air/fuel ratio.

In other words, the compression stroke injection in the in-cylinder injection type internal combustion engine effects the laminar combustion at the super-lean air/fuel ratio aiming mainly at improving the fuel economy. As a result, the compression stroke injection of the in-cylinder injection type internal combustion engine is executed exclusively in the lean air/fuel ratio region.

However, the internal combustion engine of this kind is troubled by various problems: that the drive is performed at a far leaner air/fuel ratio than that of the existing internal combustion engine for injecting the fuel into the intake passage so that the exhaust gas temperature drops to inactivate the once active catalyst; and that the fuel injection timing varies between the suction stroke and the compression stroke in dependence upon the drive state so that the torque fluctuates.

We have made experiments by changing the target air/fuel ratio of the compression stroke injection to the outside the super-lean air/fuel ratio region so as to find effective means for solving those problems, and have found that the engine characteristics at the time when the compression stroke injection was effected in the air/fuel ratio region in the vicinity of the stoichiometric air/fuel ratio were drastically different from those at the suction stroke injection time.

An object of the invention is to provide an in-cylinder internal combustion engine which is enabled to solve the problems inherent to the in-cylinder internal combustion engine by exploiting the engine characteristic changes at the time when the air/fuel ratio region of the compression stroke injection is extended.

SUMMARY OF THE INVENTION

According to a first aspect of the invention, there is provided an in-cylinder injection type internal combustion engine which has: a first operation mode for performing a suction stroke injection while making an air/fuel ratio feedback control performing a stoichiometric air/fuel ratio as a first target air/fuel ratio; and a second operation mode for performing a compression stroke injection while making an air/fuel ratio feedback control performing a predetermined air/fuel ratio in the vicinity of the stoichiometric air/fuel ratio as a second target air/fuel ratio, and selectively switching each drive mode under a predetermined condition.

According to this in-cylinder injection type internal combustion engine, the suction stroke injection at the stoichiometric air/fuel ratio or the compression stroke injection in the vicinity of the stoichiometric air/fuel ratio is selectively performed so that the exhaust gas characteristics or the output characteristics are improved by exploiting the changes of the engine characteristics accompanied with the switching of the injection modes.

In the embodiment of the invention, it is preferable that the operation mode switching means switches the operation mode to the first operation mode when the internal combustion engine is in the medium/high load drive state and switches the operation mode to the second operation mode when the internal combustion engine is in the drive state demanding a temperature rise of the catalyst of an exhaust purifying catalyst. It is preferable that the second target air/fuel ratio in the air/fuel ratio feedback control in the second operation mode is set at a slightly leaner air/fuel ratio than the stoichiometric air/fuel ratio.

According to our aforementioned experiments, the emissions of the reduced components such as carbon monoxide (CO) or the excess oxygen ($O_2$) at the time of performing the compression stroke injection in the vicinity of the stoichiometric air/fuel ratio are more than those at the suction stroke injection at the stoichiometric air/fuel ratio. With the compression stroke injection in the vicinity of stoichiometric air/fuel ratio, more specifically, a rich air/fuel ratio region is established locally in the combustion chamber so that the incomplete combustion occurs to produce much CO while leaving much $O_2$ in the remaining combustion chamber regions. As a result, the emissions of CO and $O_2$ at the compression stroke injection time in the vicinity of the stoichiometric air/fuel ratio are more than those at the suction stroke injection time at the stoichiometric air/fuel ratio. When the CO and $O_2$ exhausted from the combustion chamber reach the catalyst, moreover, the CO and $O_2$ cause oxidations under the action of the catalyst so that the catalyst temperature is raised by the result heat of reaction. In the medium load drive region, therefore, the necessary engine output can be generated, and the catalyst temperature can be raised in response to its demand. By the compression stroke injection at the lean air/fuel ratio, the rich misfire or the poor fuel economy is prevented, and the emission of smoke is suppressed to improve the exhaust characteristics.

In the embodiment of the invention, air/fuel ratio detecting means is preferably constructed of oxygen concentration detecting means. By using this oxygen concentration detecting means, the sensor system relating to the air/fuel ratio feedback control is made simple and inexpensive, and the control itself is simplified.

On the other hand, the output of the oxygen concentration detecting means is ordinarily turned at the stoichiometric air/fuel ratio between a first output value and a second output value. In the air/fuel ratio feedback control, moreover, an air/fuel ratio correction value is generally variably adjusted in response to that output turn. Therefore, the oxygen concentration detecting means has an output turning point (or first output turning point) at which the output is turned between the first output value and the second output value.

According to our experiments, when the emissions of the reduced components and the excess oxygen are augmented by the compression stroke injection in the vicinity of the stoichiometric air/fuel ratio, the output turning point of the oxygen concentration detecting means shifts from the stoichiometric air/fuel ratio in dependence upon the construction of the oxygen concentration detecting means. When an oxygen sensor used is prepared by coating the inner and outer surfaces of a cylindrical zirconia element with porous platinum electrodes having catalytic actions, for example, the sensor output turning point (or second output turning point) during the execution of the compression stroke injection in the vicinity of the stoichiometric air/fuel ratio shifts to the leaner side by an air/fuel ratio of about 0.3 to 1.0 from the first output turning point corresponding to the stoichiometric air/fuel ratio. By making the feedback control at the oxygen sensor output turning point shifted to the leaner side in the second mode, therefore, the reduced components and the excess oxygen can be optimized to efficiently raise the temperature of the catalyst disposed in an exhaust passage, for example.

In the aforementioned embodiment of the invention, preferably, the air/fuel ratio correction value to be made variable according to the output of the oxygen concentration detecting means in the air/fuel ratio feedback control is corrected to increase or decrease when the operation mode is switched.

According to the air/fuel ratio feedback control for making the air/fuel ratio correction value variable in response to the turn of the oxygen sensor output, the sensor output turning point is shifted to the leaner side, as has been described hereinbefore. Just after the operation mode switching between the first operation mode and the second operation mode, therefore, the shift of the output turning point of the oxygen sensor output is delayed to delay the optimization of the air/fuel ratio correction value (as should be referred to FIG. 8). Thus, a convergence into a new target air/fuel ratio accompanied with the operation mode switching may take a long time to deteriorate the stability in the air/fuel ratio control.

Therefore, the air/fuel ratio control is stabilized by correcting to increase/decrease the air/fuel ratio correction value at the operation mode switching time to forcibly bring the practical air/fuel ratio just after the operation mode switching close to a new target air/fuel ratio so that the time period required for the air/fuel ratio to converge into the new target air/fuel ratio may be shortened to stabilize the air/fuel ratio control. In other words, the air/fuel ratio feedback control, based on the new target air/fuel ratio, is started early, even when the fuel injection timing changes according to the switching between the suction stroke injection and the compression stroke injection.

In the aforementioned embodiment of the invention, more preferably, the air/fuel ratio correction value in the first operation mode is subtracted and corrected (refer to FIG. 6) at the time of switching the operation mode from the first operation mode to the second operation mode. When the second operation mode is switched to the first operation mode, on the other hand, the air/fuel ratio correction value in the second operation mode is added and corrected. This subtraction/addition correction may be a fixed value or may be determined according to the engine running state (e.g., the engine speed and the volumetric efficiency) from a preset map. According to this preferred mode of embodiment, the air/fuel ratio correction at the operation mode switching time is optimized.

BRIEF DESCRIPTION OF THE DRAWINGS

The present invention will become more fully understood from the detailed description given hereinafter and the accompanying drawing which are given by way of illustration only, and thus are not limitation of the present invention, and wherein.

DETAILED DESCRIPTION OF THE INVENTION

Figure 1:
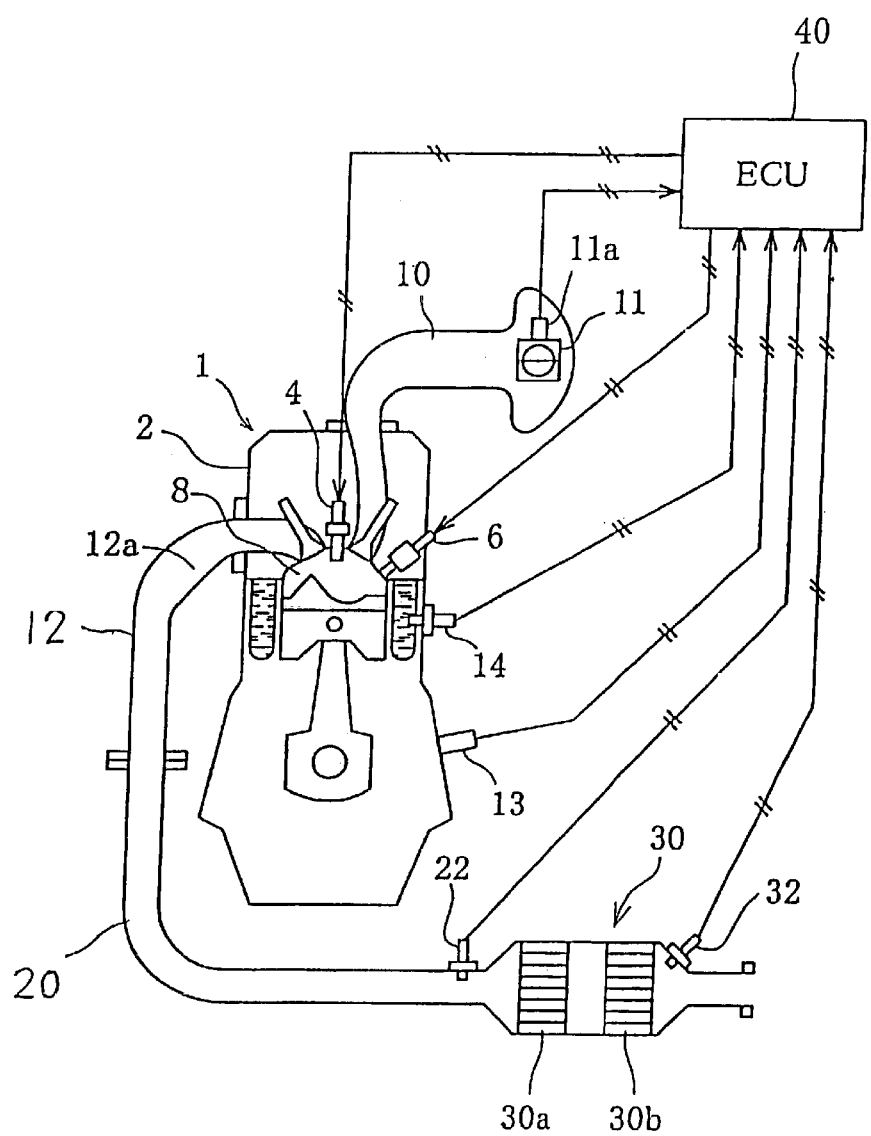
FIG. 1 is a schematic diagram showing an in-cylinder injection type internal combustion engine according to one preferred embodiment of the invention.

With reference to FIG. 1, an internal combustion engine according to one preferred embodiment of the present invention includes an engine body including an in-cylinder injection type spark ignition straight-four gasoline engine 1, for example. The engine 1 is equipped at each cylinder with an ignition plug 4 and a solenoid type fuel injection valve 6. The fuel from a fuel tank to the fuel injection valve 6 is fed under a desired pressure by a low-pressure fuel pump and a high-pressure fuel pump of a fuel feeding system.

In the cylinder head 2, an intake duct and an exhaust duct, which are connected to one end of an intake manifold and to one end of an exhaust manifold 12, respectively, are formed for each cylinder. The intake manifold is provided with a throttle valve 11 on its other end. The exhaust manifold 12 is preferably a reaction type having such a large capacity at its trunk portion as to promote reactions between the unburned fuel contents and the excess oxygen.

An exhaust pipe (or exhaust passage) 20, connected to the exhaust manifold 12, is provided with an exhaust purifying catalyst and an $O_2$ sensor (or oxygen concentration detecting means) 22 for detecting the $O_2$ concentration in the exhaust gas, i.e., the practical air/fuel ratio. The $O_2$ sensor 22 has an output that changes at a stoichiometric ratio, so that its output voltage takes a large value (or first output value) on the rich air/fuel ratio side and a small value (or second output value) near zero on the lean air/fuel ratio side. The exhaust purifying catalyst is equipped with a selective reduction type NOx catalyst 30a for selectively cleaning the NOx in the exhaust gas at the learn air/fuel ratio running time in the presence of HC, and a tertiary catalyst 30b arranged downstream of the NOx catalyst 30a. At the downstream of the tertiary catalyst 30b, an exhaust temperature sensor 32 for detecting the exhaust gas temperature representing the temperature of the exhaust purifying catalyst is provided.

An ECU (Electronic Control Unit) 40 for synthetically controlling the in-cylinder injection type internal combustion engine is provided with an input/output unit, a storage unit, a central processing unit, and a timer counter. To the input side of the ECU 40, a throttle sensor 11a attached to the throttle valve 11 for detecting a throttle opening θth, a crank angle sensor 13 for detecting a crank angle and an engine speed Ne, a cooling water temperature sensor 14 for detecting an engine cooling water temperature, the $O_2$ sensor 22, the exhaust temperature sensor 32, and so on are connected. An ignition plug 4, a fuel injection valve 6, and so on are connected to the output side of the ECU 40. On the basis of the detected information of the sensors, the ECU 40 determines optimum values for the fuel injection rate, the fuel injection timing, the ignition timing and so on to control the fuel injection timing and the ignition timing.

More specifically, the ECU (or operation mode switching means) 40 receives a target mean effective pressure Pe corresponding to the engine load on the basis of the throttle opening (th and the engine speed Ne, and sets the fuel injection mode (or operation mode) according to the target mean effective pressure Pe and the engine speed Pe with reference to a (not shown) fuel injection mode setting map. When both the target mean effective pressure Pe and the engine speed Ne are low, for example, a compression stroke injection mode for injecting the fuel in the compression stroke while making an air/fuel ratio open loop control performing an extraordinary lean air/fuel ratio (e.g., about 25 to 40) as the target air/fuel ratio is selected. When either the target means effective pressure Pe or the engine speed Ne is high, on the other hand, a suction stroke injection mode for injecting the fuel in the suction stroke is selected. This suction stroke injection mode includes: a suction lean mode for an air/fuel ratio open loop control performing a lean air/fuel ratio (about 15 to 22) as the target air/fuel ratio; a suction stroke feedback mode (or first operation mode) for an air/fuel ratio feedback control performing the stoichiometric value as the target air/fuel ratio; and an open loop mode for an air/fuel ratio open loop control performing a rich air/fuel ratio as the target air/fuel ratio. In the following, the suction $O_2$-/B mode will mean the suction stroke air/fuel ratio feedback mode.

In an engine running mode with the temperature of the exhaust purifying catalyst being low, moreover, a compression stroke $O_2$ feedback mode (or second operation mode) for a compression stroke injection that makes the air/fuel ratio feedback control performing a stoichiometric value or a slightly leaner air/fuel ratio (e.g., 14.7 to 16) as the target air/fuel ratio is selected. In the following, the compression $O_2$-F/B mode will mean the compression stroke $O_2$ feedback mode.

Moreover, an open time period Tinj of the fuel injection valve is determined from the following Formula:

Tinj=TB×KFB×K+TD,

Here, letters TB indicate a fundamental injection time determined from a volumetric efficiency EV and a gain of the fuel injection valve, and letters KFB indicate an $O_2$-F/B air/fuel ratio correction coefficient. On the other; hand, letter K indicates a product of various correction coefficients including the cooling water temperature correction coefficient, the ambient temperature correction coefficient, and the atmosphere correction coefficient, and letters TD indicate an ineffective injection time period of the fuel injection valve. The correction coefficient (or air/fuel ratio correction value) KFB is obtained by correcting to increase/decrease the value 1 with an integral term I and a proportional term P of the feedback control and a learned $O_2$-F/B value KLRN stored in a nonvolatile RAM. Specifically, the feedback correction coefficient KFB is determined by subtracting the sum of a leaning integral gain IGL and the proportional term P from the sum of the value 1 and the learned value KLRN, when the $O_2$ sensor output voltage V is higher than a threshold level VS (or 0.5 V) and when the current air/fuel ratio is leaner than the stoichiometric value. The feedback correction coefficient KFB is determined (as should be referred to FIG. 6) by adding the sum of the value 1 and the learned value KLRN and the sum of an enriched integral gain IGR and the proportional term P, when the $O_2$ sensor output voltage V is lower than a threshold level VS (or 0.5 V) and when the current air/fuel ratio is richer than the stoichiometric value.

The situation where the catalyst temperature is low will be coarsely divided into the case in which the temperature of the exhaust purifying catalyst is lowered to a level no more than the active temperature by the exhaust temperature drop in the engine operation, and the case in which the temperature of the exhaust purifying catalyst becomes low (at a cold start) because the engine 1 stops for a long time.

When the engine continues to run for a predetermined time period while it is active at a low speed in the compression stroke injection mode of the extraordinary lean air/fuel ratio or when the exhaust temperature detected by the exhaust temperature sensor 32 is lower than an allowable level (or a predetermined condition), it is determined that the drive comes to the situation where the exhaust temperature drops. In either of the aforementioned drive situations, the operation mode shifts to the compression $O_2$-F/B mode in which the engine run is executed for a predetermined time period, when the engine speed Ne, the target mean effective pressure Pe, and a vehicle speed V do not exceed their individually preset values, that is, when the engine run is not in the state to raise the exhaust temperature.

In this operation mode, the compression stroke injection is performed while making the air/fuel ratio feedback control performing the stoichiometric or slightly leaner air/fuel ratio as the target air/fuel ratio, as described hereinbefore, so that the rich air/fuel ratio state is established locally in the cylinder to produce relatively more carbon monoxide by the incomplete combustion of the fuel and to leave the hydrogen produced by the combustion as it is. At the portion in the combustion chamber apart from the rich air/fuel ratio region, on the other hand, there is much excess oxygen. As a result, the carbon monoxide, the hydrogen, and the excess oxygen are simultaneously discharged to the exhaust manifold 12 so that most of them reach the exhaust cleaning catalyst 30. As a result, the exhaust purifying catalyst is heated by the heat of reaction resulting from the oxidation of CO and $H_2$ with the selective type NOx catalyst 30a and the tertiary catalyst 30b.

As the target air/fuel ratio in the compression $O_2$-F/B mode is shifted to the leaner air/fuel ratio side, the fuel injection rate becomes lower to reduce the CO emission and accordingly, the smoke emission. Preferably, the ignition timing and the injection ending timing are so exemplified by 5 degrees BTDC and 55 degrees BTDC, respectively, to reduce the smoke emission and to produce sufficient CO. In other words, the interval between the ignition timing and the injection ending timing is set to 40 degrees CA to 60 degrees CA.

When the catalyst temperature is low (under the predetermined condition), according to the cold start of the engine, on the other hand, the engine is run in the compression $O_2$-F/B mode if the $O_2$ sensor is activated. If this $O_2$ sensor is not active, on the other hand, the two-stage injection, in which the main fuel is injected in the suction stroke or in the compression stroke and in which the auxiliary fuel is then injected in the expansion stroke, that is, the compression slightly lean (open loop) is performed when the idle switch (not shown) is OFF, when the engine speed Ne, the target mean effective pressure Pe, and the vehicle speed V are individually not higher than the preset values, and when the cooling water temperature is not higher than the warm-up value, that is, when there is no possibility of the torque shortage and an overheat. At the two-stage injection, the unburned fuel components, due to the injection of the auxiliary fuel, are burned under the action of the reaction type exhaust manifold to raise the exhaust temperature. When it is determined by a two-stage injection continuation time discriminating timer that the catalyst temperature reaches the lowest active level or higher and when the $O_2$ sensor is inactive, the compression slightly lean (open loop) is performed.

Figure 7:
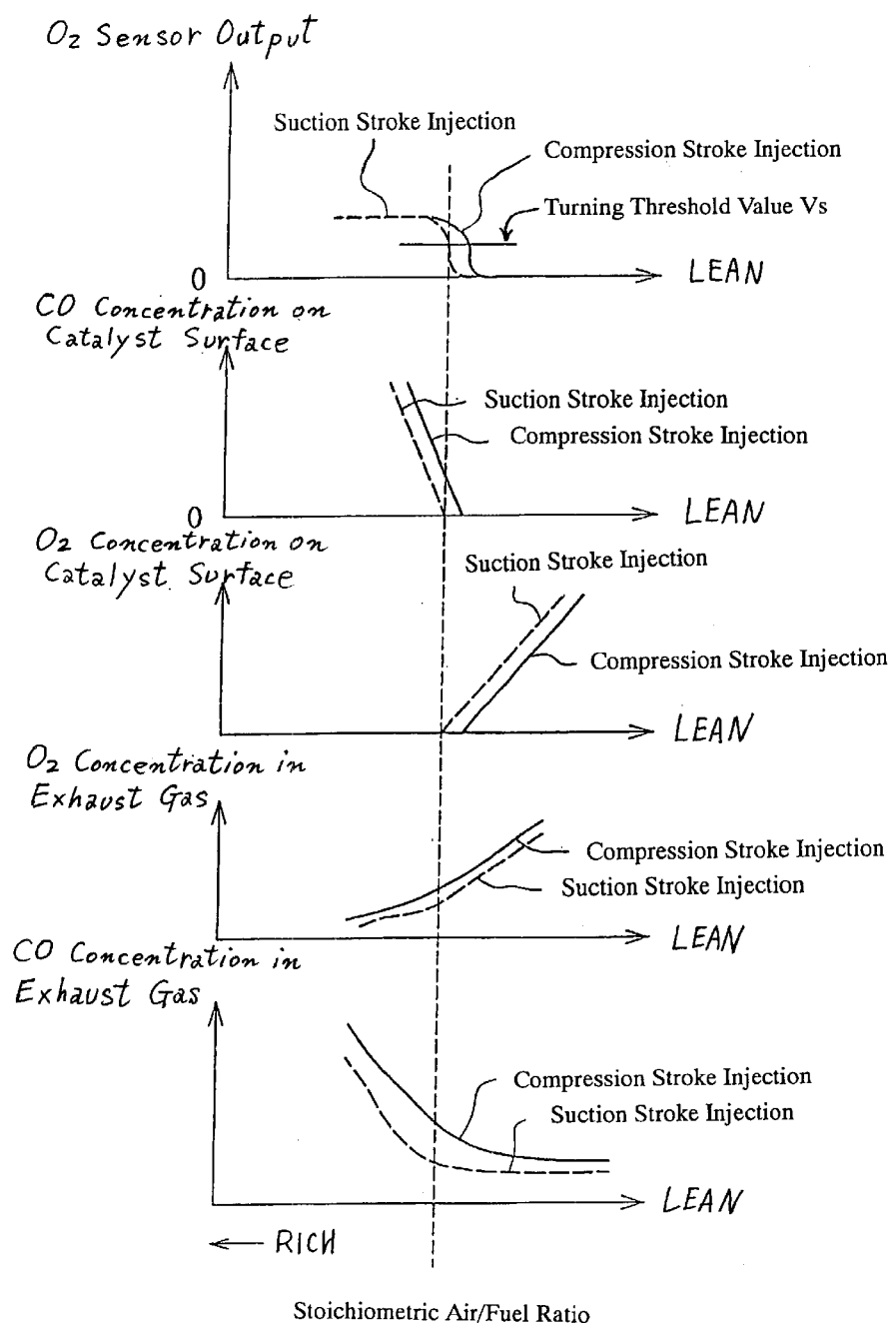
FIG. 7 presents diagrams showing the relations between an $O_2$ sensor output, a CO concentration and an $O_2$ concentration on the catalyst surface and an $O_2$ concentration and a CO concentration in the exhaust gas, and the air/fuel ratio individually for the suction stroke injection and for the compression stroke injection.
Figure 8:
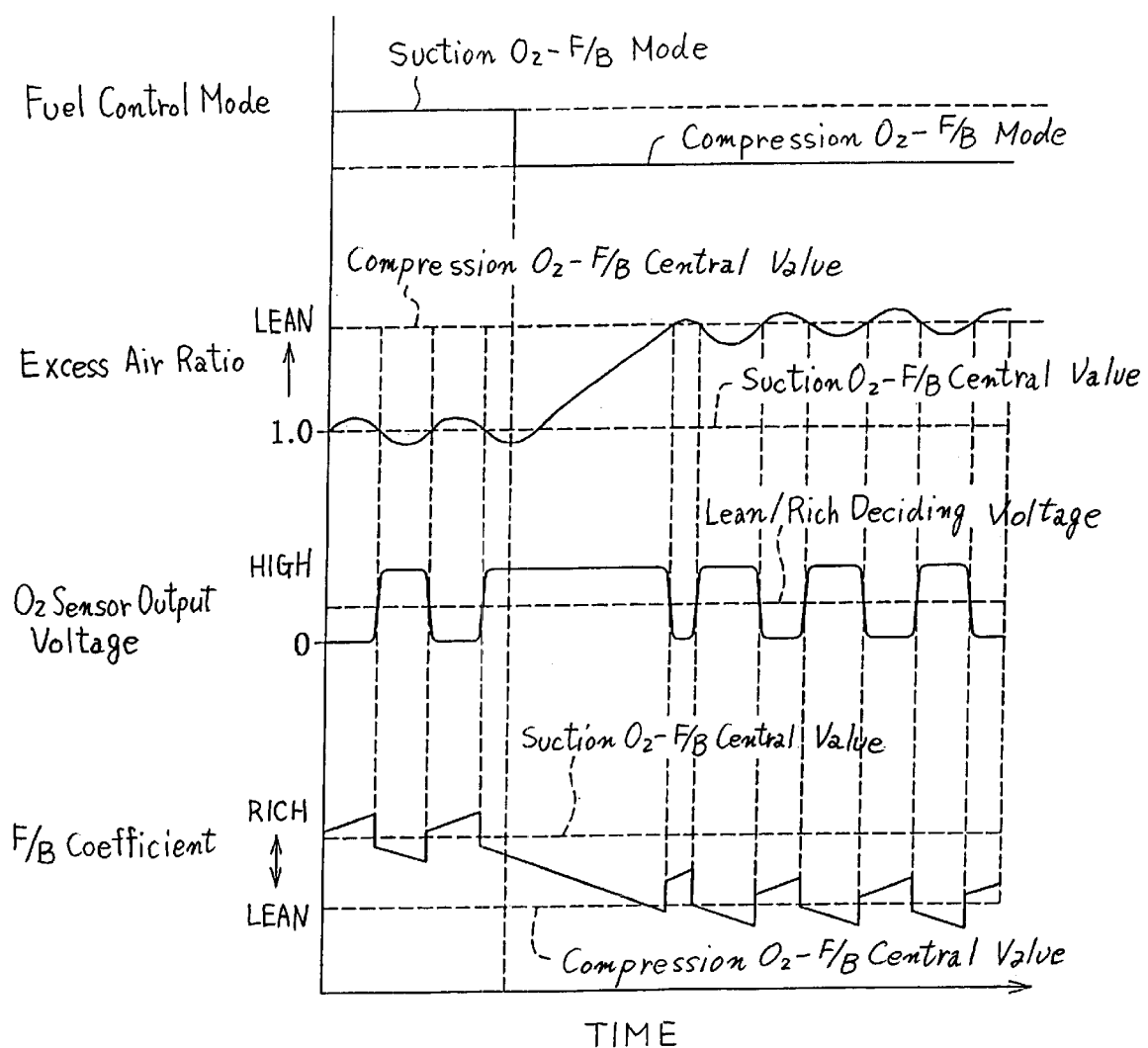
FIG. 8 is a diagram showing changes of the feedback coefficients with the lapse of time when the feedback coefficients are not subtraction-corrected at the transfer from the suction $O_2$-F/B mode to the compression $O_2$-F/B mode.

By the exhaust gas temperature rise resulting from the engine running in the compression $O_2$-F/B mode, as described above, the catalyst can be activated. When the drive state is switched from one for making the suction stroke air/fuel ratio feedback control by using the $O_2$ sensor having an output turned at the first output turning point corresponding to the stoichiometric air/fuel ratio, to another for using the $O_2$ sensor and for making the compression $O_2$-F/B mode control having the correction coefficient KFB variable according to the turn of the $O_2$ sensor output, in the $O_2$-F/B mode, the output turning point (or second output turning point) of the $O_2$ sensor is shifted from the first output turning point at the stoichiometric air/fuel ratio to the leaner side by about 0.3 to 1.0 of the air/fuel ratio. At this operation mode switching time, the shift of the $O_2$ sensor output to the second output turning point is delayed just after the operation mode is switched, and the optimization of the air/fuel ratio correction value may be delayed (as should be referred to FIGS. 7 and 8). In FIG. 7, the parameters varying depending upon the air/fuel ratio, such as the $O_2$ sensor output, are plotted by a broken curve for the suction stroke injection and by a solid curve for the compression stroke injection.

Figure 4:
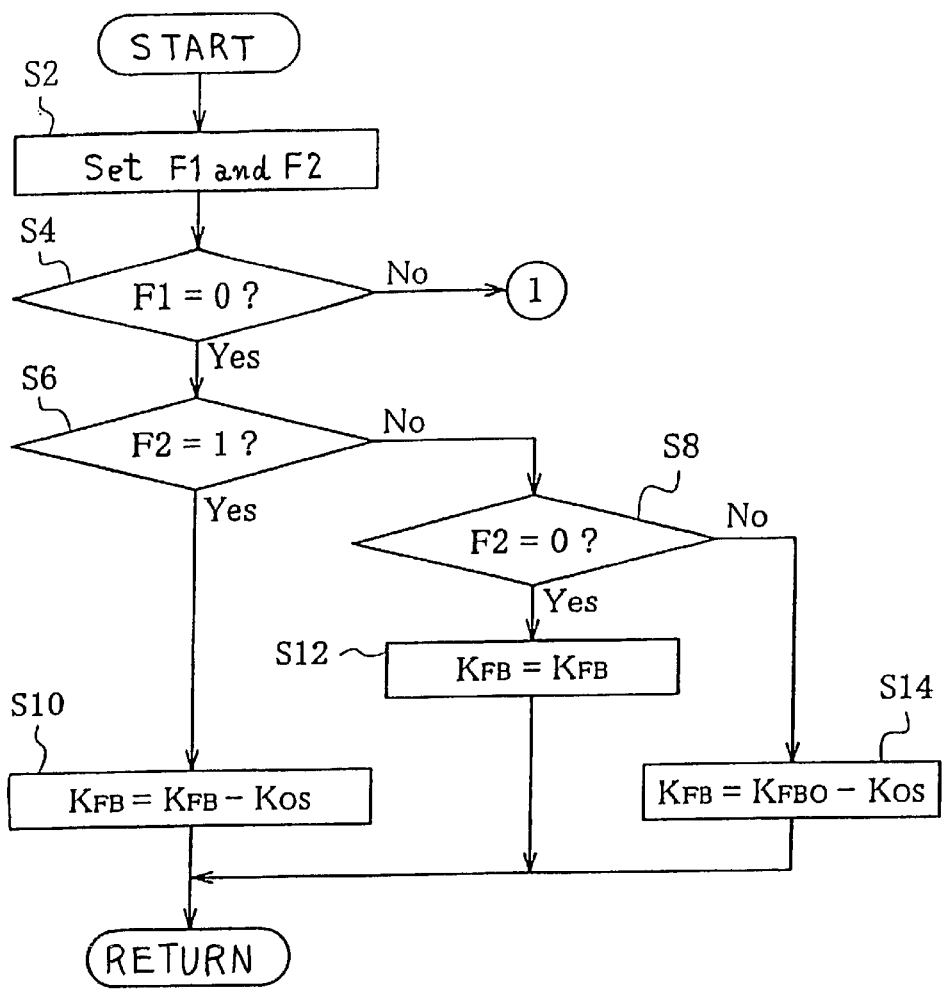
FIG. 4 is a flow chart showing a portion of an air/fuel ratio control routine of the present embodiment.
Figure 5:
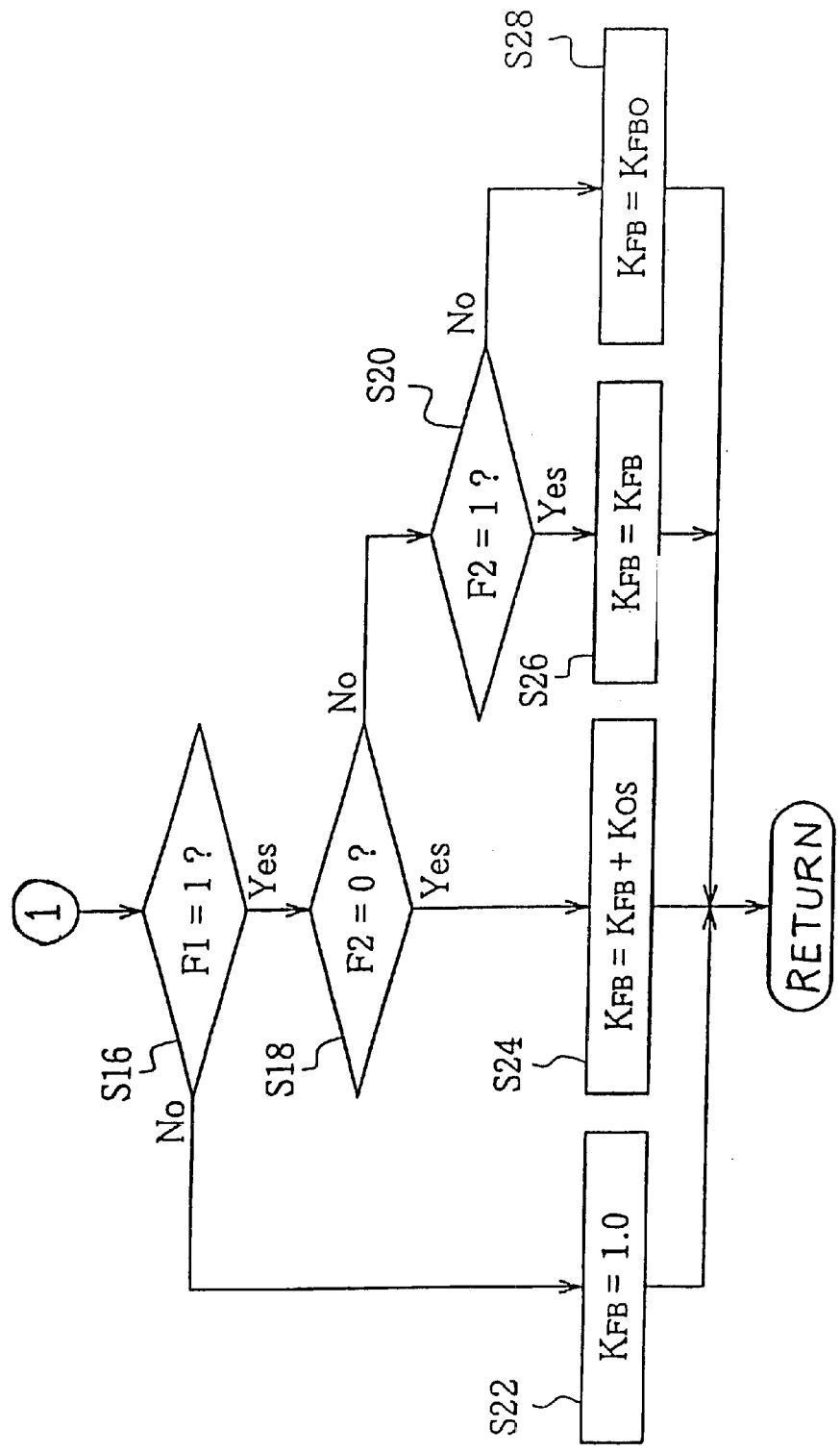
FIG. 5 is a flow chart showing the remaining portion of the air/fuel ratio control routine of the present embodiment.

In the present embodiment, the ECU (or air/fuel ratio correcting means) 40 executes the air/fuel ratio control routine, as shown in FIGS. 4 and 5, for a predetermined period to stabilize the air/fuel ratio control at the operation mode switching time.

Figure 2:
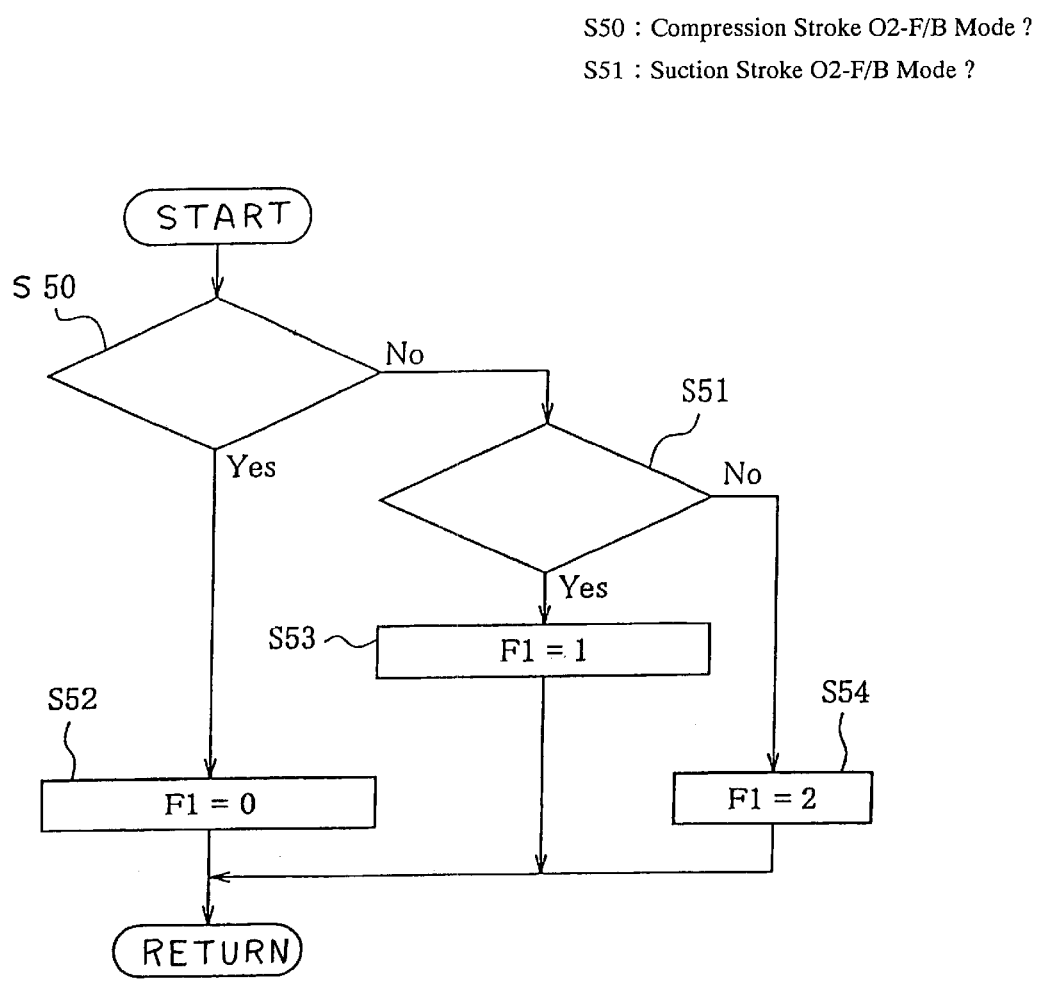
FIG. 2 is a flow chart showing a operation mode deciding control routine of the current period.
Figure 3:
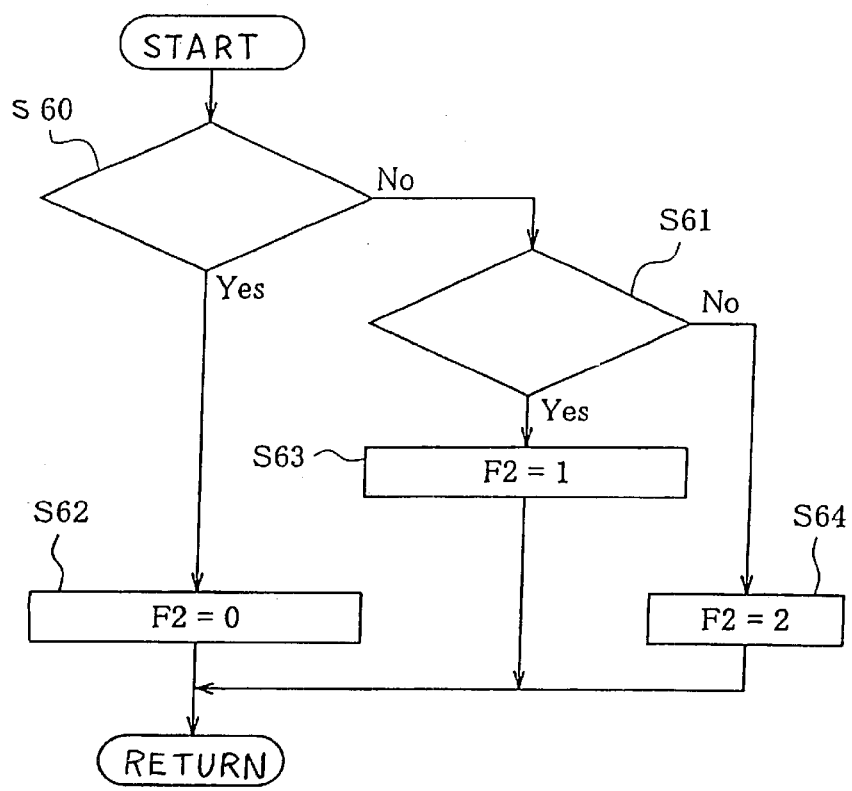
FIG. 3 is a flow chart showing a operation mode deciding control routine of the preceding period.

First of all, before this air/fuel ratio control, the operation mode determinations of the current period and the preceding period are made in control routines shown in FIGS. 2 and 3. In the control routine of FIG. 2, it is determined at first (in Step S50) by the ECU 40 whether or not the current stroke is in the compression $O_2$-F/B mode. If the answer is affirmative (YES), a flag F1 is set to 0 (in Step S52). If the answer of Step S50 is negative (NO), the routine advances to Step S51. It is determined (in Step S51) whether or not the current stroke is in the suction $O_2$-F/B mode. If this answer is YES, the routine advances to Step S53, and the flag F1 is set to 1. If the answer of Step S51 is NO, the routine advances to Step S54, the flag F1 is set to 2.

In the control routine of FIG. 3, it is determined at first (in Step S60) whether or not the stroke of the preceding period is in the compression $O_2$-F/B mode. If this answer is affirmative (YES), a flag F2 is set to 0 (in Step S62). If the answer of Step S60 is negative (NO), the routine advances to Step S61. It is determined (in Step S61) whether or not the preceding stroke is in the suction $O_2$-F/B mode. If this answer is YES, the flag F2 is set to 1. If the answer of Step S61 is NO, the routine advances to Step S64, at which the stroke of the preceding period corresponds to neither the compression $O_2$-F/B mode nor the suction $O_2$-F/B mode, and the F2 is set to 2.

Thus, by the operation mode determining control routines of FIGS. 2 and 3, the operation mode determinations of the current period and the preceding period are updated for the predetermined period.

In the air/fuel ratio control routines shown in FIGS. 4 and 5, at first at Step S2, the flags F1 and F2 set based on the operation mode determination results of the current period and the preceding period in the control routines, determined by the steps shown in FIGS. 2 and 3.

If it is determined in Step S4 that the operation mode at the current time is not the compression $O_2$-F/B mode (F1≠0), it is determined (in Step S16) whether or not the current operation mode is in the suction $O_2$-F/B mode (F1=1). If this answer is negative (NO), that is, if the operation mode of the current period is neither the compression $O_2$-F/B mode nor the suction $O_2$-F/B mode (or an open loop mode (F1=2) as a whole), the $O_2$-F/B air/fuel ratio correction coefficient KFB is set to "1.0" (in Step S22).

If the operation mode of the current period is the compression $O_2$-F/B mode (F1=0), it is determined (in Step S6) whether or not the operation mode of the preceding period was in the suction $O_2$-F/B mode. If the answer of Step S6 is affirmative (YES), that is, if it is just after the transfer from the suction $O_2$-F/B mode (F2=1) to the compression $O_2$-F/B mode, the $O_2$-F/B air/fuel ratio correction coefficient KFB is determined (in Step S10) by subtracting an offset value KOS from the updated value KFB (=1+P+I+KLRN) of the correction coefficient in the $O_2$-/B mode, as based on the PI control. If the answer of Step S6 is NO, it is determined in Step S8 whether or not the operation mode of the preceding period was in the compression $O_2$-F/B mode. If this answer is YES (F2=0), the compression $O_2$-F/B mode has continued so that the ordinary PI control (1+P+I+KLRN) is applied to the correction coefficient KFB. If the answer of Step S8 is NO (F2 ≠0), on the other hand, it is the transfer from a operation mode other than the suction $O_2$-F/B mode or the compression $O_2$-F/B mode to the compression $O_2$-F/B mode so that, the correction coefficient KFB in the $O_2$-F/B mode is set (in Step S14) by subtracting the offset value KOS from an initial value KFB0 of the $O_2$-F/B correction coefficient.

In the routine shown in FIG. 5, on the other hand, from the decision results of Step S16 and Step S18, at the switching time (F1=1 and F2=0) from the compression $O_2$-F/B mode to the suction $O_2$-F/B mode, the $O_2$-F/B air/fuel ratio correction coefficient KFB is determined (in Step S24) by adding the offset value KOS to the correction coefficient KFB (=1+P+I+KLRN) in the $O_2$-F/B mode. If it is determined in Step S20 that the mode of the preceding period is other than the $O_2$-F/B mode, on the other hand, it is the transfer time (F1=1 and F2=2) from a operation mode other than the $O_2$-F/B mode to the suction $O_2$-F/B mode, so that the initial value KFB0 of the correction coefficient in the $O_2$-F/B mode is set (in Step S28) as the $O_2$-F/B air/fuel ratio correction coefficient KFB. When the suction $O_2$-F/B is continued (F1=1 and F2=1), the correction coefficient KFB is updated (in Step S26) on the basis of the PI control.

Here, the subtraction/addition correction value KOS may be a fixed value or may be determined according to the engine drive state (e.g., the engine speed or the volumetric efficiency) from a preset map.

Figure 6:
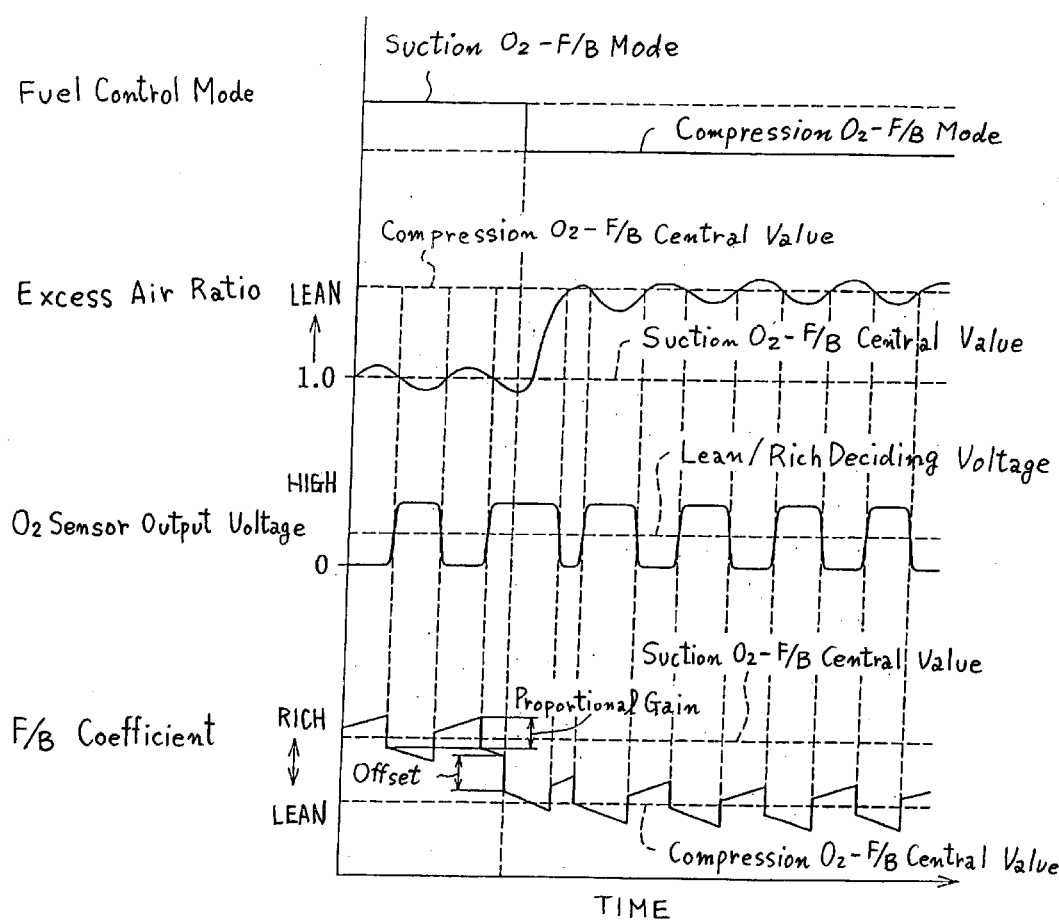
FIG. 6 is a diagram showing changes of feedback coefficients with the lapse of time by the air/fuel ratio control routine of the present embodiment of FIGS. 4 and 5 and before and after the transfer from a suction $O_2$-F/B mode to a compression $O_2$-F/B mode.

By correcting to increase/decrease the correction coefficient KFB at the switching time from the suction $O_2$-F/B mode or the open loop mode to the compression $O_2$-F/B mode and at the switching time from the compression $O_2$-F/B mode to the suction $O_2$-F/B mode, as described hereinbefore, the practical air/fuel ratio just after the mode switching can be forced to approach a new target air/fuel ratio, and the time period required for the air/fuel ratio to converge to the new target air/fuel ratio is shortened to start the air/fuel ratio feedback control earlier on the basis of the new target air/fuel ratio thereby to stabilize the air/fuel ratio control (refer to FIG. 6).

The invention should not be limited to the embodiment thus far described. For example, the engine operation ranges, the set sections of the operation modes, and the kinds of mode switching for the offset adjustment of the correction coefficient KFB should not be limited to those of the embodiment. In the embodiment, on the other hand, the compression stroke injection in the vicinity of the stoichiometric air/fuel ratio is effected according to a demand for raising the catalyst temperature to improve the exhaust gas characteristics. This compression stroke injection may be performed to improve the engine output characteristics by changing the mode through the compression stroke $O_2$ feedback mode to suppress the torque shock accompanied with the mode change at the transfer time from the compression stroke injection mode performing the super-lean air/fuel ratio as the target air/fuel ratio to the suction stroke feedback mode or the open loop mode. In this case, the predetermined conditions are represented not by the catalyst temperature but by the changing rate of the accelerator depression or the throttle opening, for example.

The invention being thus described, it will be obvious that the same may be varied in many ways. Such variation are not to be regarded as a departure from the spirit and scope of the invention, and all such modification as would be obvious to one skilled in the art are intended to be included within the scope of the following claims.

What is claimed:

1. An in-cylinder injection type internal combustion engine for injecting a fuel into a combustion chamber from a fuel injection valve arranged to confront said combustion chamber, comprising:

air/fuel ratio detecting means disposed in an exhaust passage of said internal combustion engine for detecting an exhaust air/fuel ratio; and operation mode switching means having a first operation mode for injecting the fuel in a suction stroke while making an air/fuel ratio feedback control performing a stoichiometric air/fuel ratio as a first target air/fuel ratio, and a second operation mode for injecting the fuel in a compression stroke while making an air/fuel ratio feedback control performing a predetermined air/fuel ratio in the vicinity of the stoichiometric air/fuel ratio as a second target air/fuel ratio, wherein said operation mode switching means switches said first operation mode and said second operation mode selectively under a predetermined condition.

2. An in-cylinder injection type internal combustion engine according to claim 1, wherein said air/fuel ratio detecting means includes oxygen concentration detecting means having an output changing in response to an oxygen concentration in an exhaust gas between a first output value indicating a rich air/fuel ratio and a second output value indicating a lean air/fuel ratio.

3. An in-cylinder injection type internal combustion engine according to claim 2, wherein said oxygen concentration detecting means includes, a first output turning point at which the output changes at said first target air/fuel ratio in said first operation mode between said first output value and said second output value; and a second output turning point at which the output changes at said second target air/fuel ratio leaner than the stoichiometric air/fuel ratio in said second operation mode between said first output value and said second output value, and wherein the air/fuel ratio feedback control in said first operation mode and said second operation mode is made according to the output of said oxygen concentration detecting means.

4. An in-cylinder injection type internal combustion engine according to claim 2, further comprising:

air/fuel ratio correcting means for setting air/fuel ratio correction values according to the output of said oxygen concentration detecting means in the air/fuel ratio feedback controls in said first operation mode and said second operation mode, wherein said air/fuel ratio correcting means corrects to increase/decrease said air/fuel ratio correction values when said operation mode is switched.

5. An in-cylinder injection type internal combustion engine according to claim 4, wherein said air/fuel ratio correcting means corrects to subtract the air/fuel ratio correction value set in said first operation mode, when the operation mode is switched from said first operation mode to said second operation mode, and wherein said air/fuel ratio correcting means corrects to add the air/fuel ratio correction value set in said second operation mode, when switched from said second operation mode to said first operation mode.

6. An in-cylinder injection type internal combustion engine according to claim 1, wherein said operation mode switching means switches an operation mode to said first operation mode when said internal combustion engine is in a medium/high load drive state demanding an improvement in output characteristics, and the operation mode to said second operation mode when said internal combustion engine is in a drive state demanding a temperature rise of the catalyst of an exhaust purifying catalyst.

7. An in-cylinder injection type internal combustion engine according to claim 1, wherein said operation mode switching means sets said second target air/fuel ratio in the air/fuel ratio feedback control in said second operation mode, to an air/fuel ratio leaner than said stoichiometric air/fuel ratio.

8. An in-cylinder injection type internal combustion engine for injecting a fuel into a combustion chamber from a fuel injection valve arranged to confront said combustion chamber, comprising:

operation mode setting means for setting at least a first operation mode for injecting the fuel in a suction stroke while making an air/fuel ratio feedback control performing a stoichiometric air/fuel ratio as a first target air/fuel ratio;

oxygen concentration detecting means having a first output turning point at which the output changes in said first operation mode in accordance with an oxygen concentration in an exhaust gas between a first output value indicating a rich air/fuel ratio and a second output value indicating a lean air/fuel ratio; and fuel control means for controlling the fuel to be fed from said fuel injection valve according to said first operation mode and the output of said oxygen concentration detecting means in response to a drive state of said internal combustion engine, wherein said operation mode setting means sets a second operation mode for increasing emissions of reduced components and excess oxygen by performing the compression stroke injection at a second target air/fuel ratio leaner than said first target air/fuel ratio, and wherein said fuel control means makes a fuel control according to said second operation mode, whereby said oxygen concentration detecting means shifts the first output turning point thereof to a second output turning point at which the output changes on a leaner side than said first output turning point between said first output value and said second output value.

9. An in-cylinder injection type internal combustion engine according to claim 8, wherein said fuel control means is enabled to make the air/fuel ratio feedback control in the compression stroke by controlling the fuel according to said set second operation mode and the output of said oxygen concentration detecting means, as shifted to said second output turning point.

10. An in-cylinder injection type internal combustion engine according to claim 9, further comprising:

air/fuel ratio correcting means for setting an air/fuel ratio correction values according to the output of said oxygen concentration detecting means in the air/fuel ratio feedback controls in mutual operation modes, wherein said air/fuel ratio correcting means corrects to increase/decrease said air/fuel ratio correction values prior to the mode switching between said mutual operation modes.

11. An in-cylinder injection type internal combustion engine for injecting a fuel into a combustion chamber from a fuel injection valve arranged to confront said combustion chamber, comprising:

air/fuel ratio detecting means disposed in an exhaust passage of said internal combustion engine for detecting an exhaust air/fuel ratio; and operation mode switching means having a first operation mode for injecting the fuel in a suction stroke while making an air/fuel ratio feedback control performing a stoichiometric air/fuel ratio as a first target air/fuel ratio, and a second operation mode for injecting the fuel in a compression stroke while making an air/fuel ratio control, based on an output of said air/fuel ratio detecting means, to perform a predetermined air/fuel ratio in the vicinity of the stoichiometric air/fuel ratio as a second target air/fuel ratio, wherein said operation mode switching means switches the operation mode to said first operation mode when said internal combustion engine is in a medium/high load drive state demanding an improvement in output characteristics, and the operation mode to said second operation mode when said internal combustion engine is in a drive state demanding a temperature rise of the catalyst of an exhaust purifying catalyst.

\* \* \* \* \*